US010606752B2

(12) United States Patent
Tian et al.

(10) Patent No.: US 10,606,752 B2
(45) Date of Patent: Mar. 31, 2020

(54) COORDINATED CACHE MANAGEMENT POLICY FOR AN EXCLUSIVE CACHE HIERARCHY

(71) Applicant: Samsung Electronics Co., Ltd., Suwon-si, Gyeonggi-do (KR)

(72) Inventors: Yingying Tian, Austin, TX (US); Tarun Nakra, Austin, TX (US); Khang Nguyen, Round Rock, TX (US); Ravikanth Reddy, Austin, TX (US); Edwin Silvera, Austin, TX (US)

(73) Assignee: SAMSUNG ELECTRONICS CO., LTD. (KR)

( * ) Notice: Subject to any disclaimer, the term of this patent is extended or adjusted under 35 U.S.C. 154(b) by 178 days.

(21) Appl. No.: 15/890,240

(22) Filed: Feb. 6, 2018

(65) Prior Publication Data

US 2019/0138449 A1    May 9, 2019

Related U.S. Application Data

(60) Provisional application No. 62/582,122, filed on Nov. 6, 2017.

(51) Int. Cl.
| | | |
|---|---|---|
| *G06F 12/00* | (2006.01) | |
| *G06F 13/00* | (2006.01) | |
| *G06F 13/28* | (2006.01) | |
| *G06F 12/0811* | (2016.01) | |
| *G06F 12/0862* | (2016.01) | |
| *G06F 12/128* | (2016.01) | |

(Continued)

(52) U.S. Cl.
CPC ...... *G06F 12/0811* (2013.01); *G06F 12/0862* (2013.01); *G06F 12/0897* (2013.01); *G06F 12/128* (2013.01); *G06F 12/127* (2013.01); *G06F 2212/602* (2013.01); *G06F 2212/604* (2013.01); *G06F 2212/6024* (2013.01)

(58) Field of Classification Search
CPC . G06F 12/0811; G06F 12/0862; G06F 12/127
USPC ........................................................ 711/118
See application file for complete search history.

(56) References Cited

U.S. PATENT DOCUMENTS

| | | |
|---|---|---|
| 5,546,559 A | 8/1996 | Kyushima et al. |
| 7,552,286 B2 | 6/2009 | Davis et al. |

(Continued)

*Primary Examiner* — Edward J Dudek, Jr.
*Assistant Examiner* — Sidney Li
(74) *Attorney, Agent, or Firm* — Renaissance IP Law Group LLP

(57) ABSTRACT

Embodiments include a method and system for coordinating cache management for an exclusive cache hierarchy. The method and system may include managing, by a coordinated cache logic section, a level three (L3) cache, a level two (L2) cache, and/or a level one (L1) cache. Managing the L3 cache and the L2 cache may include coordinating a cache block replacement policy among the L3 cache and the L2 cache by filtering data with lower reuse probability from data with higher reuse probability. The method and system may include tracking reuse patterns of demand requests separately from reuse patterns of prefetch requests. Accordingly, a coordinated cache management policy may be built across multiple levels of a cache hierarchy, rather than a cache replacement policy within one cache level. Higher-level cache behavior may be used to guide lower-level cache allocation, bringing greater visibility of cache behavior to exclusive last level caches (LLCs).

16 Claims, 8 Drawing Sheets

(51) Int. Cl.
  *G06F 12/0897*  (2016.01)
  *G06F 12/127*  (2016.01)

(56) References Cited

U.S. PATENT DOCUMENTS

| | | |
|---|---|---|
| 7,793,044 B1 | 9/2010 | Spracklen et al. |
| 2002/0087802 A1* | 7/2002 | Al-Dajani ............... G06F 9/383 |
| | | 711/137 |
| 2006/0224830 A1 | 10/2006 | Davis et al. |
| 2007/0094450 A1* | 4/2007 | VanderWiel .......... G06F 12/126 |
| | | 711/133 |
| 2010/0217937 A1 | 8/2010 | Symes et al. |
| 2015/0347297 A1 | 12/2015 | Hagersten et al. |
| 2015/0347302 A1* | 12/2015 | Hagersten ........... G06F 12/0862 |
| | | 711/122 |
| 2016/0259689 A1 | 9/2016 | Mukherjee |
| 2016/0259734 A1 | 9/2016 | Mukherjee |

* cited by examiner

COORDINATED CACHE MANAGEMENT POLICY FOR AN EXCLUSIVE CACHE HIERARCHY

RELATED APPLICATION DATA

This application claims the benefit of co-pending U.S. Provisional Patent Application Ser. No. 62/582,122, filed on Nov. 6, 2017, which is hereby incorporated by reference.

FIELD

The present disclosure relates to cache management, and more particularly, to a coordinated cache management method and device for an exclusive cache hierarchy.

BACKGROUND

Exclusive cache hierarchies are widely used in the computer industry. However, exclusive last level cache (LLC) cache replacement is hard to manage. For example, it is difficult to be aware of computer program behavior since cache accesses are filtered out through higher-level caches. Moreover, there is a lack of locality information since reused cache lines are swapped back to higher-level caches. Adding to the difficulty is that there is no notion of hit promotion for frequently accessed cache lines. Conventional exclusive LLC replacement policies do not preserve useful data in the wake of 1) large sequences of non-temporal accesses, or 2) when an application working set exceeds a cache capacity. In addition, conventional least recently used (LRU) and/or re-reference interval prediction (RRIP) related schemes default to cache thrashing in such cases, thereby reducing cache performance.

SUMMARY

Embodiments include a method and system for coordinating cache management for an exclusive cache hierarchy. The method and system may include managing, by a coordinated cache logic section, a level three (L3) cache, a level two (L2) cache, and/or a level one (L1) cache. Managing the L3 cache and the L2 cache may include coordinating a cache block replacement policy among the L3 cache and the L2 cache by filtering data with lower reuse probability from data with higher reuse probability. The method and system may include tracking reuse patterns of demand requests separately from reuse patterns of prefetch requests. Accordingly, a coordinated cache management policy may be built across multiple levels of a cache hierarchy, rather than a cache replacement policy within one cache level. Higher-level cache behavior may be used to guide lower-level cache allocation, bringing greater visibility of cache behavior to exclusive last level caches (LLCs).

BRIEF DESCRIPTION OF THE DRAWINGS

The foregoing and additional features and advantages of the present disclosure will become more readily apparent from the following detailed description, made with reference to the accompanying figures, in which.

DETAILED DESCRIPTION

Figure 1A:
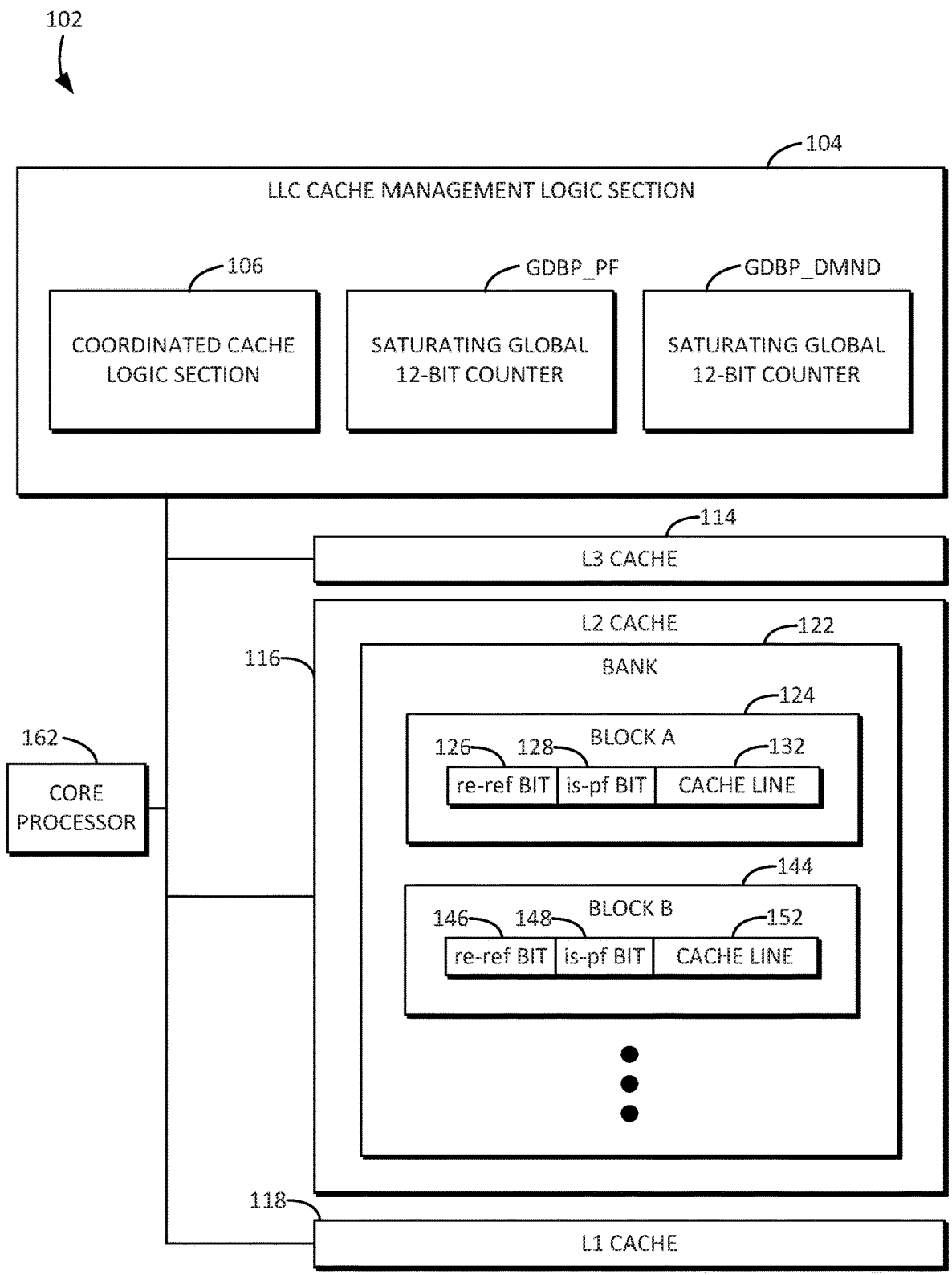
FIG. 1A is an example block diagram of a cache system in accordance with some embodiments.

Reference will now be made in detail to various embodiments, examples of which are illustrated in the accompanying drawings. In the following detailed description, numerous specific details are set forth to enable a thorough understanding of the embodiments. It should be understood, however, that persons having ordinary skill in the art may practice the embodiments without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first cache could be termed a second cache, and, similarly, a second cache could be termed a first cache, without departing from the scope of the embodiments.

The terminology used in the description of the embodiments herein is for the purpose of describing particular embodiments only and is not intended to be limiting of the embodiments. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Disclosed herein is a coordinated cache management technique. Some of the characteristics of the disclosed coordinated cache management technique include 1) higher-level (L2) cache tracks line reuse and the passing of this information to a lower-level exclusive L3 cache, 2) the exclusive L3 cache uses reuse information to decide allocation policy for write-allocates from the L2 cache into L3 cache, and 3) the exclusive L3 cache gains greater visibility of cache line reuse. This technique is thrash-resistant across multiple cache levels. For example, the L2 cache detects cache lines that thrash the L3 cache. In addition, the exclusive L3 cache allocates these cache lines near a least recently used (LRU) position, or otherwise chooses not to allocate the cache lines at all. Moreover, the disclosed technique preserves lines in the L3 cache having a higher probability of being re-referenced, thereby increasing performance.

Accordingly, a coordinated cache management policy may be built across multiple levels of a cache hierarchy, rather than a cache replacement policy within one cache level. Higher-level cache behavior may be used to guide lower-level cache allocation, bringing greater visibility of cache behavior to exclusive last level caches (LLCs). Cache data with lower reuse probability may be filtered from data with higher reuse probability across multiple cache levels with minimal overhead.

FIG. 1A is an example block diagram of a cache system 102 in accordance with some embodiments. The cache system 102 may include three cache levels: a level three (L3) cache 114, a level two (L2) cache 116, and a level one (L1) cache 118. The three caches may be managed by an LLC cache management logic section 104. The L2 cache 116 may include one or more banks (e.g., 122). Each bank 122 may include a corresponding cache line (e.g., 124 and 144). Each cache block (e.g., block A 124 and block B 144) may include a plurality of cache lines (e.g., 132 and 152). Each cache line (e.g., 132 and 152) may have associated therewith a re-reference bit (e.g., re-ref bits 126 and 146) and a prefetch bit (e.g., is-pf bits 128 and 148). In other words, the block A 124 may have a re-ref bit 126 and an is-pf bit 128, which may be referred to herein as A[re-ref] and A[is-pf], respectively. Similarly, the block B may have a re-ref bit 146 and an is-pf bit 148, which may be referred to herein as B[re-ref] and B[is-pf], respectively. The re-ref bits (e.g., re-ref bits 126 and 146) and the is-pf bits (e.g., is-pf bits 128 and 148) may be initialized to zeroes (i.e., 0s).

The LLC cache management logic section 104 may include a coordinated cache logic section 106. For each bank 122 in the L2 cache 116, the LLC cache management logic section 104 may maintain two global dead block prediction counters (GDBPs). Each GDBP may be a saturating global 12-bit counter, one for prefetch requests (e.g., GDBP_PF), and another for demand requests (e.g., GDBP_DMND). The GDBP_PF and the GDBP_DMND may be initialized with all 12 bits set.

A core processor 162 may be communicatively coupled to the various caches (e.g., L1 cache 118, L2 cache 116, and L3 cache 114), and to the LLC cache management logic section 104. In some embodiments, the core processor 162 includes the LLC cache management logic section 104. In some embodiments, the core processor 162 is separate from the LLC cache management logic section 104. The core processor 162 may receive data provided by one or more of the various caches, and may cause data to be stored to one or more of the various caches.

Figure 1B:
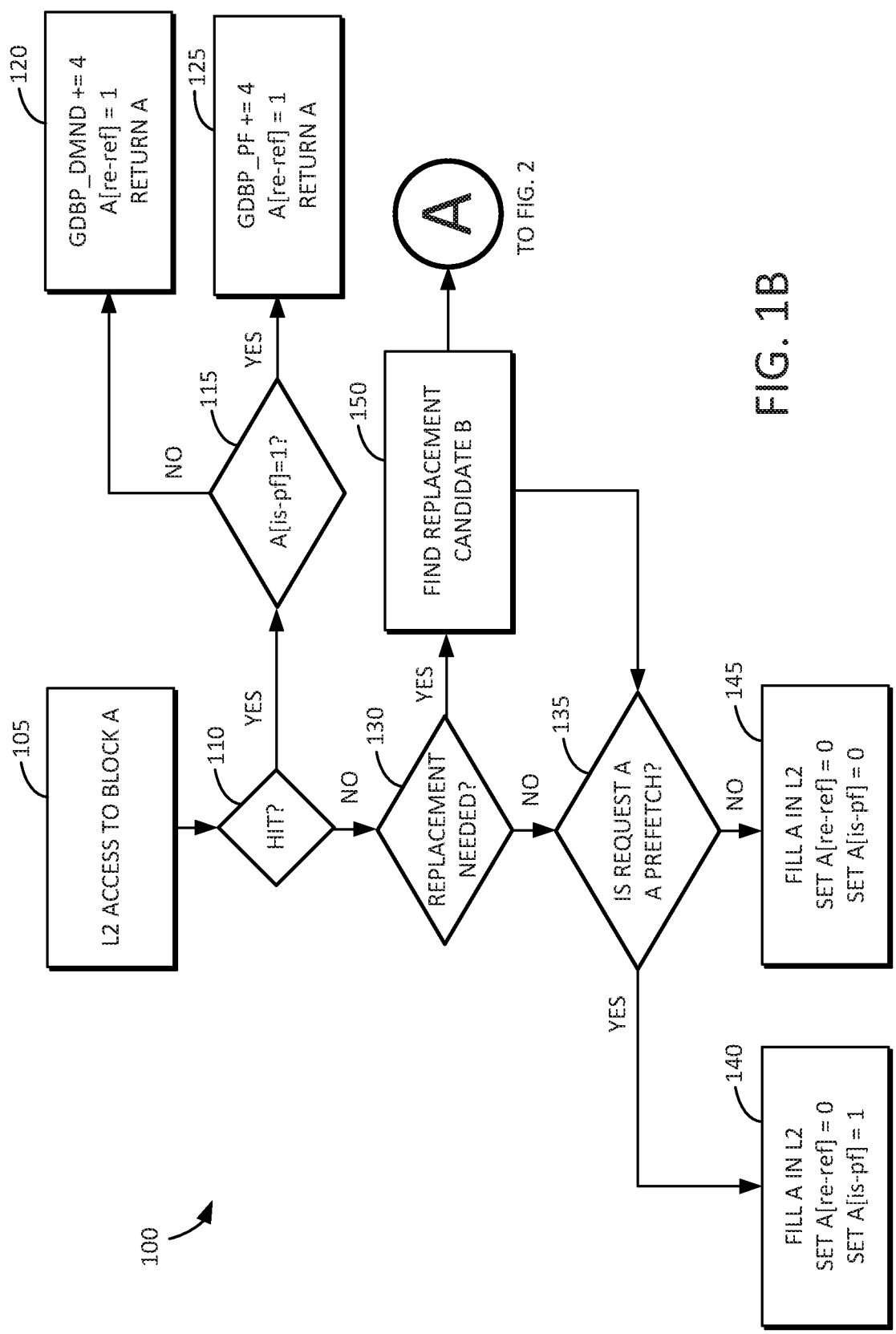
FIG. 1B is flow diagram illustrating a first part of a cache management technique in accordance with some embodiments.

FIG. 1B is a flow diagram 100 illustrating a first part of a cache management technique in accordance with some embodiments. The technique begins at 105, in which a block (e.g., block A) is inserted into the L2 cache (e.g., L2 cache 116). At 110, the coordinated cache logic section 106 may determine whether a block is hit in the L2 cache. The following discussion is related to a block hit in the L2 cache. In response to the determination at 110 being YES, then at 115, another determination is made whether the block was originally prefetched (A[is-pf] is 1). The coordinated cache logic section 106 may make this determination. In response to the determination at 115 being YES, then GDBP_PF is increased by 4 at 125, thereby indicating that prefetching tends to bring in blocks with temporal locality. Temporal locality means a block may be needed in a relatively short period of time. Also at 125, A[re-ref] may be set to 1, and the block A may be returned. In other words, the data stored in the block A may be provided from the L2 cache to the core processor 162.

In response to the determination at 115 being NO, then GDBP_DMND is increased by 4 at 120, thereby indicating that blocks brought in by demand requests tend to be re-referenced by the core processor 162. Also at 120, A[re-ref] may be set to 1, and the block A may be returned. In other words, the data stored in the block A may be provided from the L2 cache to the core processor 162.

In response to the determination at 110 being NO, meaning no cache hit, the technique proceeds to 130. At 130, the coordinated cache logic section 106 may determine whether a block replacement is needed. In response to determining at 130 that a block replacement is not needed, the technique proceeds to 135. At 135, the coordinated cache logic section 106 may determine whether a request for a block (e.g., block A) is a prefetch request. In other words, a determination is made whether a block is inserted into the L2 cache by a prefetch request. In response to determining at 135 that the block A is brought in by a prefetch request, the technique proceeds to 140, in which the block A is filled or inserted into the L2 cache. In addition, the coordinated cache logic section 106 sets A[re-ref] to 0, and A[is-pf] to 1. Otherwise, if the coordinated cache logic section 106 determines at 135 that the request is not a prefetch request, then the technique proceeds to 145, in which the block A is filled or inserted into the L2 cache, the coordinated cache logic section 106 sets A[re-ref] to 0, and sets A[is-pf] to 0.

Referring back to 130, in response to the coordinated cache logic section 106 determining that a block replacement is needed, the technique proceeds to 150. At 150, the coordinated cache logic section 106 finds a block replacement candidate (e.g., block B), and the technique may continue to FIG. 2 through circle A, or may otherwise proceed to 135.

Figure 2:
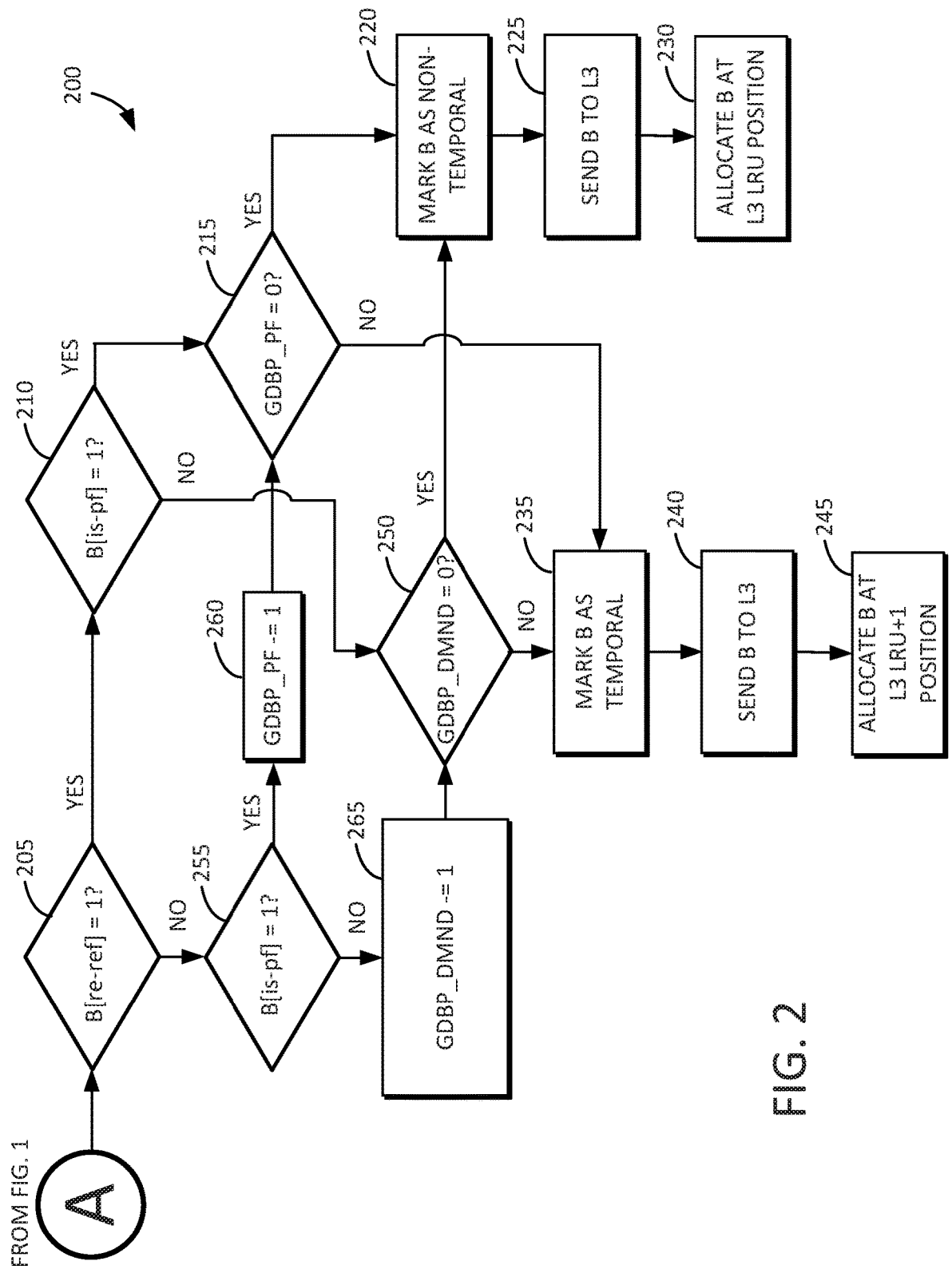
FIG. 2 is flow diagram illustrating a second part of the cache management technique of FIG. 1B in accordance with some embodiments.

FIG. 2 is flow diagram 200 illustrating a second part of the cache management technique of FIG. 1B in accordance with some embodiments. The flow comes in from FIG. 1B through circle A. The following discussion is related to a block being evicted from the L2 cache. At 205, the coordinated cache logic section 106 may determine whether the replacement candidate B was re-referenced (B[re-ref] is 1). In response to determining NO at 205, the technique proceeds to 255, where the coordinated cache logic section 106 may determine whether the replacement candidate B was originally prefetched (B[is-pf] is 1). In response to determining YES at 255, then the coordinated cache logic section 106 may decrease GDBP_PF by 1 at 260, thereby indicating the prefetching requests brought in a non-temporal block in the L2 cache. A non-temporal block means that the block probably won't be needed for a relatively long period of time. In response to determining NO at 255, then the coordinated cache logic section 106 may decrease GDBP_DMND by 1 at 265, thereby indicating demand requests brought in blocks without being reused.

At 215, the coordinated cache logic section 106 may determine whether GDBP_PF is 0. In response to determining YES at 215, this indicates high confidence to predict blocks that are brought in by prefetching requests are non-temporal. At 220, the coordinated cache logic section 106 may mark the block B as non-temporal. At 225, the coordinated cache logic section 106 may send the block B to the L3 cache. At 230, the coordinated cache logic section 106 may allocate the block B at the LRU position of the L3 cache. The L3 cache allocates non-temporal blocks in the LRU position to avoid polluting the cache.

After the coordinated cache logic section 106 decreases GDBP_DMND by 1 at 265, the coordinated cache logic section 106 may determine whether GDBP_DMND is 0 at 250. In response to determining YES at 250, this indicates that blocks that are brought in by demand requests are non-temporal, and the flow proceeds to 220, 225, and 230 discussed above. Otherwise, in response to determining NO at 250, the technique proceeds to 235, where coordinated cache logic section 106 may mark the block B as temporal. At 240, the coordinated cache logic section 106 may send the block B to the L3 cache. At 245, the coordinated cache logic section 106 may allocate the block B at an LRU+1 position in the L3 cache.

In response to determining YES at 205, the technique proceeds to 210, where the coordinated cache logic section 106 determines whether block B was originally prefetched (B[is-pf] is 1). In response to determining NO at 210, the technique proceeds to 250, which is explained in detail above. Otherwise, in response to determining YES at 210, the technique proceeds to 215, where the coordinated cache logic section 106 determines whether GDBP_PF is 0. In response to determining YES at 215, the technique proceeds to 220, 225, and 230 explained above. Otherwise, in response to determining NO at 215, the technique returns to 235, 240, and 245, also explained above.

Figure 3:
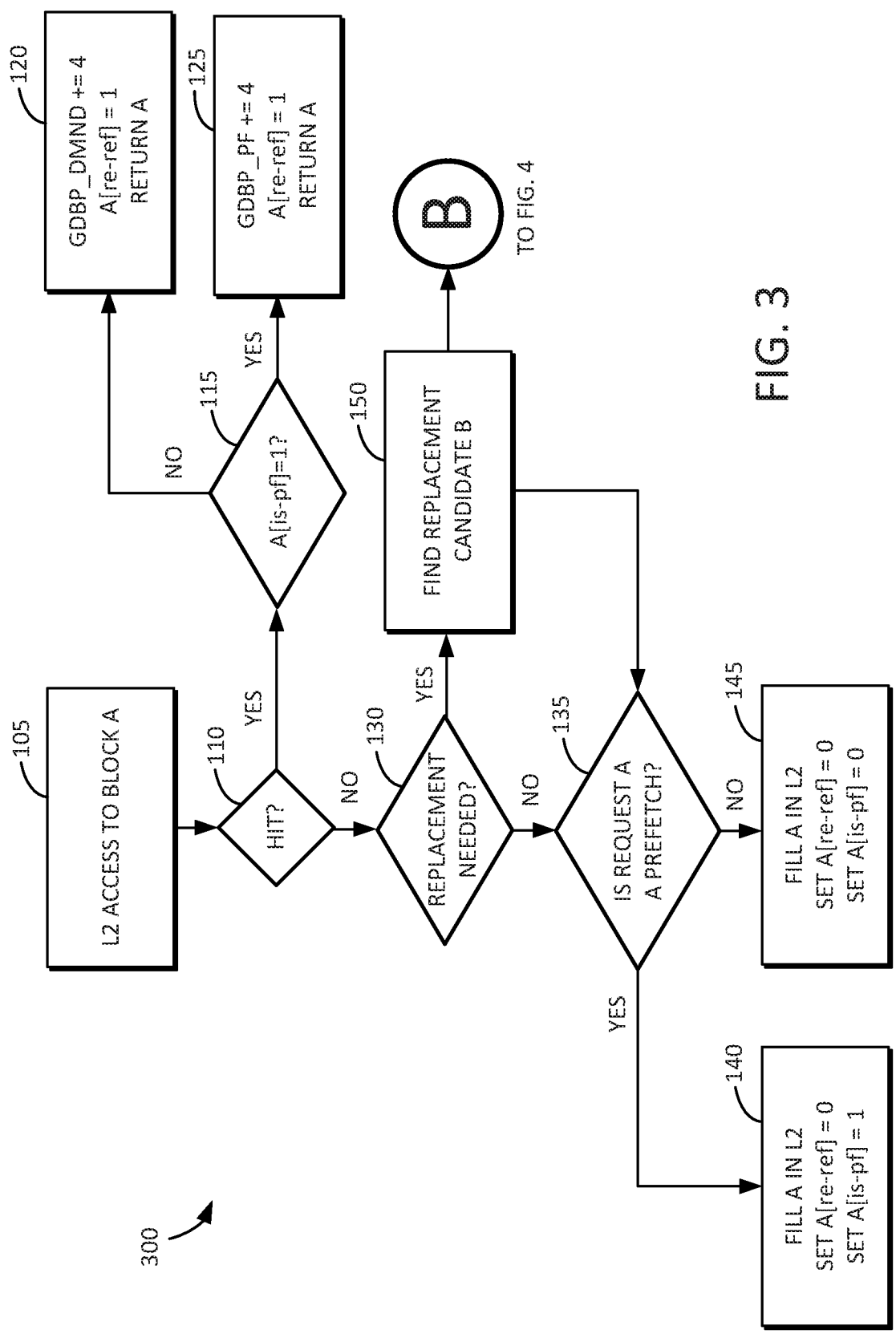
FIG. 3 is flow diagram illustrating a first part of another cache management technique in accordance with some embodiments.

FIG. 3 is flow diagram 300 illustrating a first part of another cache management technique in accordance with some embodiments. The technique illustrated in FIG. 3 is similar to that of FIG. 1B, and therefore a detailed description is not repeated. The sole difference is that after 150, the flow proceeds to FIG. 4 through circle B.

Figure 4:
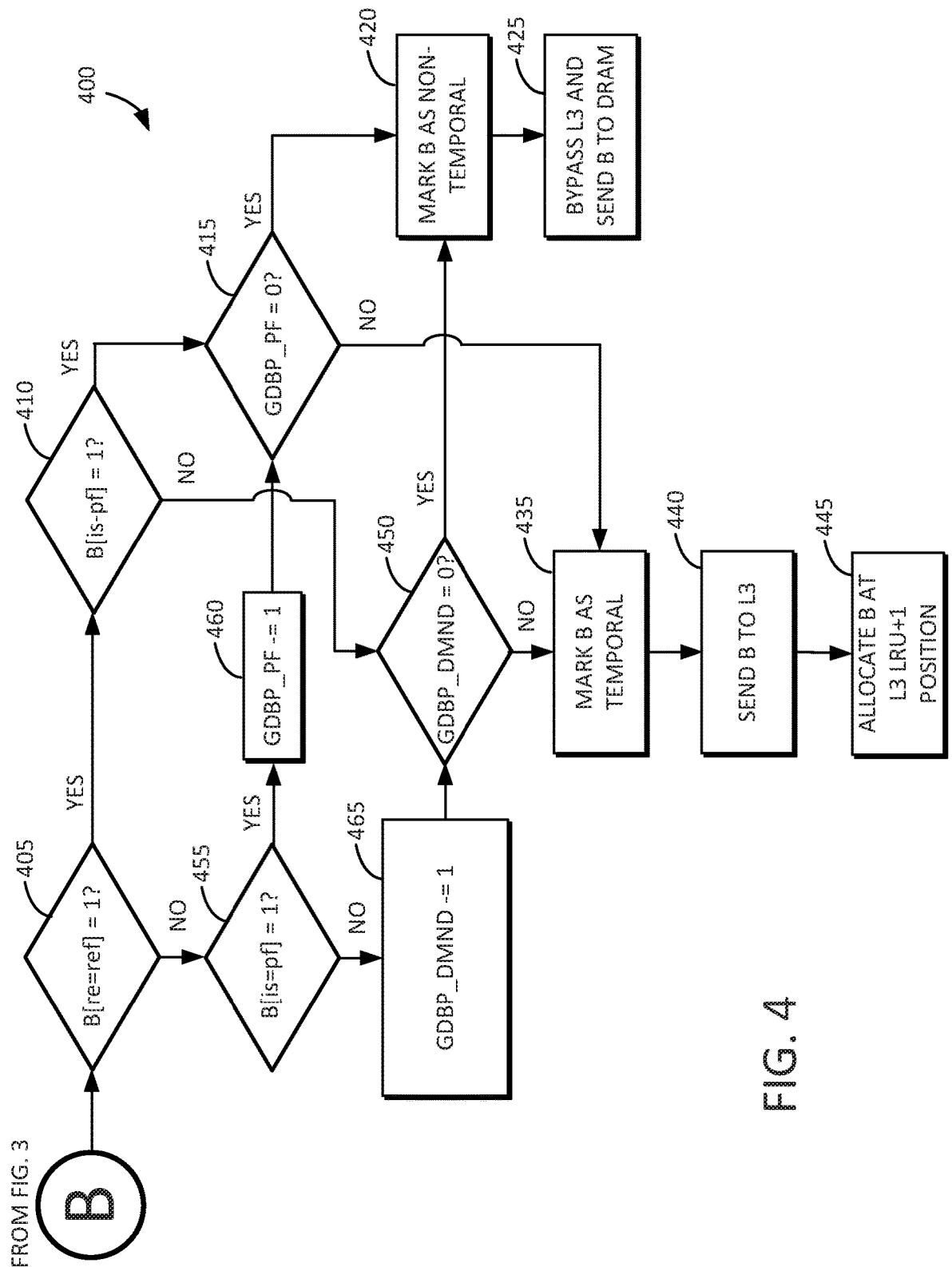
FIG. 4 is flow diagram illustrating a second part of the cache management technique of FIG. 3 in accordance with some embodiments.

FIG. 4 is flow diagram 400 illustrating a second part of the cache management technique of FIG. 3 in accordance with some embodiments. The flow comes in from FIG. 3 through circle B. The following discussion is related to a block being evicted from the L2 cache. At 405, the coordinated cache logic section 106 may determine whether the evicted block B was re-referenced (B[re-ref] is 1). In response to determining NO at 405, the technique proceeds to 455, where the coordinated cache logic section 106 may determine whether the evicted block B was originally prefetched (B[is-pf] is 1). In response to determining YES at 455, then the coordinated cache logic section 106 may decrease GDBP_PF by 1 at 460, thereby indicating the prefetching requests brought in a non-temporal block in the L2 cache. A non-temporal block means that the block probably won't be needed for a relatively long period of time. In response to determining NO at 455, then the coordinated cache logic section 106 may decrease GDBP_DMND by 1 at 465, thereby indicating demand requests brought in blocks without being reused.

At 415, the coordinated cache logic section 106 may determine whether GDBP_PF is 0. In response to determining YES at 415, this indicates high confidence to predict blocks that are brought in by prefetching requests are non-temporal. At 420, the coordinated cache logic section 106 may mark the block B as non-temporal. At 425, the coordinated cache logic section 106 may bypass the L3 cache and send the block B to main memory (e.g., to a dynamic random access memory or DRAM).

After the coordinated cache logic section 106 decreases GDBP_DMND by 1 at 465, the coordinated cache logic section 106 may determine whether GDBP_DMND is 0 at 450. In response to determining YES at 450, this indicates that blocks that are brought in by demand requests are non-temporal, and the flow proceeds to 420 and 425 discussed above. Otherwise, in response to determining NO at 450, the technique proceeds to 435, where coordinated cache logic section 106 may mark the block B as temporal. At 440, the coordinated cache logic section 106 may send the block B to the L3 cache. At 445, the coordinated cache logic section 106 may allocate the block B at an LRU+1 position in the L3 cache.

In response to determining YES at 405, the technique proceeds to 410, where the coordinated cache logic section 106 determines whether block B was originally prefetched (B[is-pf] is 1). In response to determining NO at 410, the technique proceeds to 450, which is explained in detail above. Otherwise, in response to determining YES at 410, the technique proceeds to 415, where the coordinated cache logic section 106 determines whether GDBP_PF is 0. In response to determining YES at 415, the technique proceeds to 420 and 425 explained above. Otherwise, in response to determining NO at 415, the technique returns to 435, 440, and 445, also explained above.

Compared to technique illustrated in FIG. 2, the flow illustrated in FIG. 4 relates to a bypass technique for non-temporal blocks from the L3 cache. For example, at 425 the block B may be sent back to the main memory (e.g., DRAM) directly to save cache capacity as well as energy overhead on cache fills.

Figure 5:
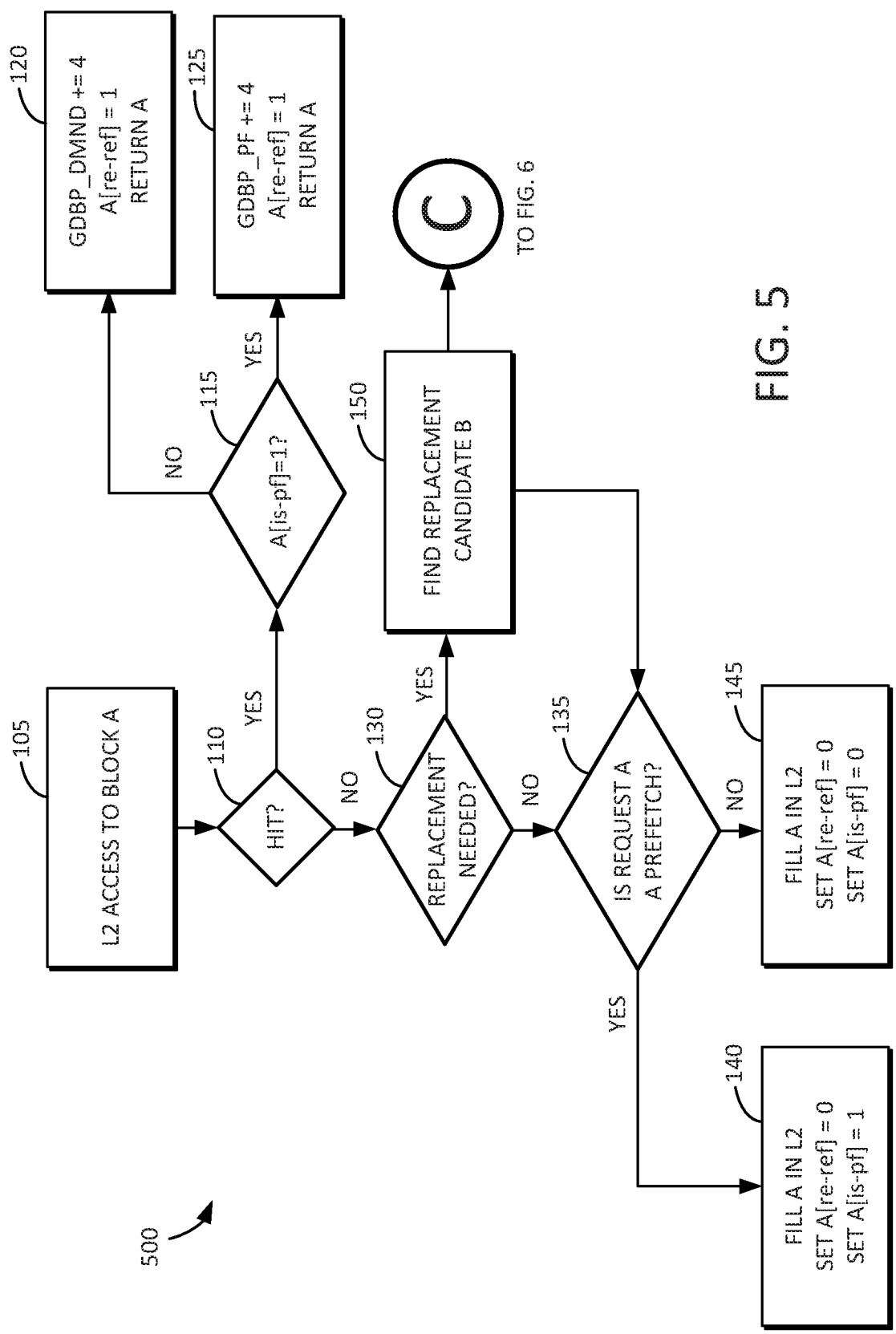
FIG. 5 is flow diagram illustrating a first part of yet another cache management technique in accordance with some embodiments.

FIG. 5 is flow diagram 500 illustrating a first part of yet another cache management technique in accordance with some embodiments. The technique illustrated in FIG. 5 is similar to that of FIG. 1B, and therefore a detailed description is not repeated. The sole difference is that after 150, the flow proceeds to FIG. 6 through circle C.

Figure 6:
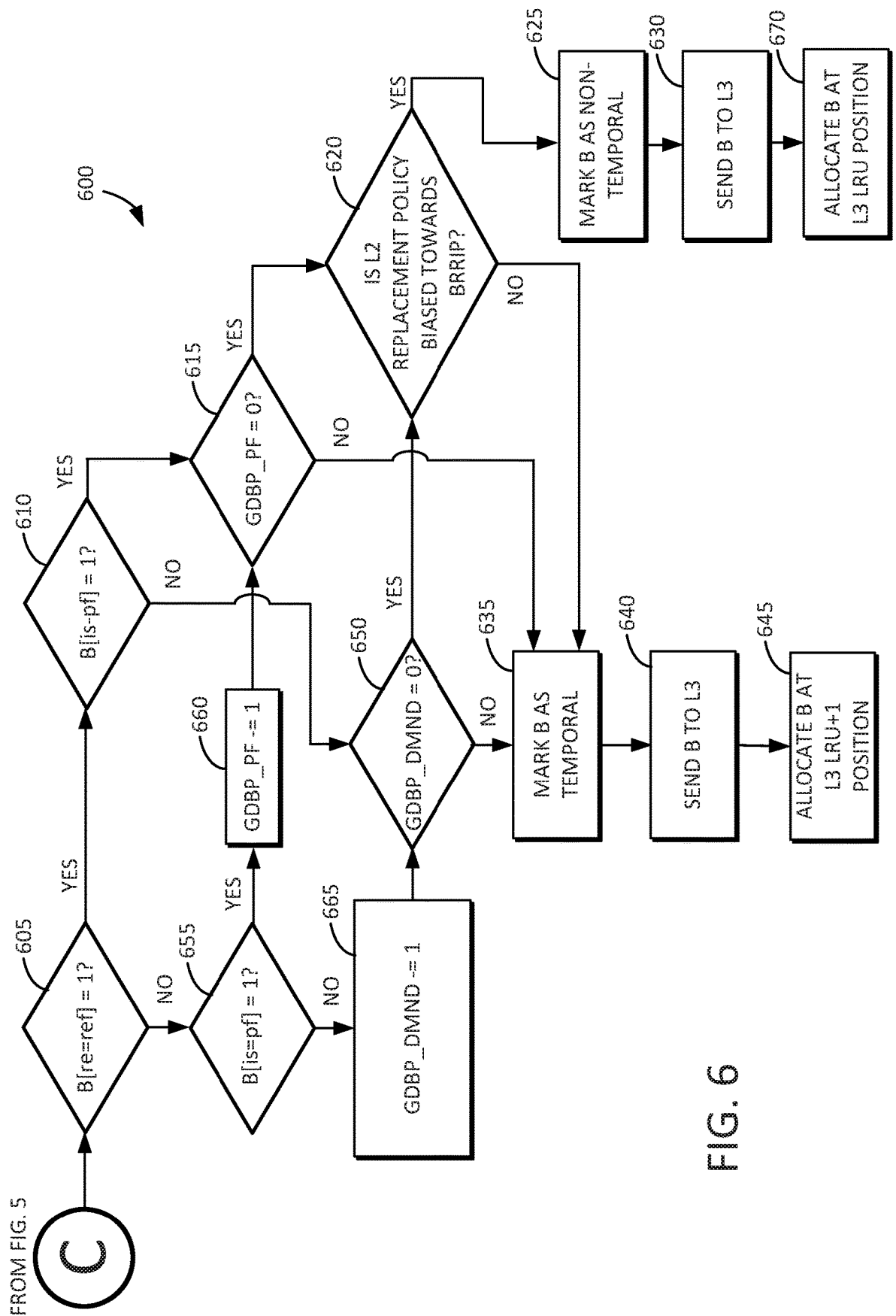
FIG. 6 is flow diagram illustrating a second part of the cache management technique of FIG. 5 in accordance with some embodiments.

FIG. 6 is flow diagram illustrating a second part of the cache management technique of FIG. 5 in accordance with some embodiments. The flow comes in from FIG. 5 through circle C. The following discussion is related to a block being evicted from the L2 cache. At 605, the coordinated cache logic section 106 may determine whether the evicted block B was re-referenced (B[re-ref] is 1). In response to determining NO at 605, the technique proceeds to 655, where the coordinated cache logic section 106 may determine whether B was originally prefetched (B[is-pf] is 1). In response to determining YES at 655, then the coordinated cache logic section 106 may decrease GDBP_PF by 1 at 660, thereby indicating the prefetching requests brought in a non-temporal block in the L2 cache. A non-temporal block means that the block probably won't be needed for a relatively long period of time. In response to determining NO at 655, then the coordinated cache logic section 106 may decrease GDBP_DMND by 1 at 665, thereby indicating demand requests brought in blocks without being reused.

At 615, the coordinated cache logic section 106 may determine whether GDBP_PF is 0. In response to determining YES at 615, this indicates high confidence to predict blocks that are brought in by prefetching requests are non-temporal. At 620, the coordinated cache logic section 106 may determine whether the L2 cache replacement policy is biased towards bimodal re-reference interval prediction (BRRIP). In response to determining YES at 620, the technique proceeds to 625, 630, and 670, explained below. Otherwise, in response to determining NO at 620, the technique proceeds to 635, also explained below. At 625, the coordinated cache logic section 106 may mark the block B as non-temporal. At 630, the coordinated cache logic section 106 may send the block B to the L3 cache. At 670, the coordinated cache logic section 106 may allocate the block B at the LRU position of the L3 cache. The L3 cache allocates non-temporal blocks in the LRU position to avoid polluting the cache.

After the coordinated cache logic section 106 decreases GDBP_DMND by 1 at 665, the coordinated cache logic section 106 may determine whether GDBP_DMND is 0 at 650. In response to determining YES at 650, this indicates that blocks that are brought in by demand requests are non-temporal, and the flow proceeds to 620, which is explained in detail above.

Referring back to 650, in response to determining NO at 650, the technique proceeds to 635, where coordinated cache logic section 106 may mark the block B as temporal. At 640, the coordinated cache logic section 106 may send the block B to the L3 cache. At 645, the coordinated cache logic section 106 may allocate the block B at an LRU+1 position in the L3 cache.

In response to determining YES at 605, the technique proceeds to 610, where the coordinated cache logic section 106 determines whether the evicted block B was originally prefetched (B[is-pf] is 1). In response to determining NO at 610, the technique proceeds to 650, which is explained in detail above. Otherwise, in response to determining YES at 610, the technique proceeds to 615, where the coordinated cache logic section 106 determines whether GDBP_PF is 0. In response to determining YES at 615, the technique proceeds to 620 explained above. Otherwise, in response to determining NO at 615, the technique returns to 635, 640, and 645, also explained above.

The technique shown in FIG. 6 is orthogonal to the technique shown in FIG. 4, and can be applied separately or together. The technique shown in FIG. 6 gears the L3 cache allocation policy towards the L2 cache Bimodal RRIP (BRRIP) replacement with thrashing detection. Gearing the L3 cache allocation policy towards the L2 cache BRRIP replacement brings thrashing-resistance across multiple cache levels. In an alternative embodiment, the coordinated cache logic section 106 can choose to bypass non-temporal blocks from the L3 cache instead of allocating them at a distant interval.

Accordingly, a coordinated cache management technique across multiple levels of a cache hierarchy is disclosed, including a cache replacement policy for an exclusive cache in which a coordinated cache logic section may filter data with lower reuse probability from data with higher reuse probability. Moreover, the coordinated cache logic section may separately track reuse patterns of demand and prefetch lines.

Figure 7:
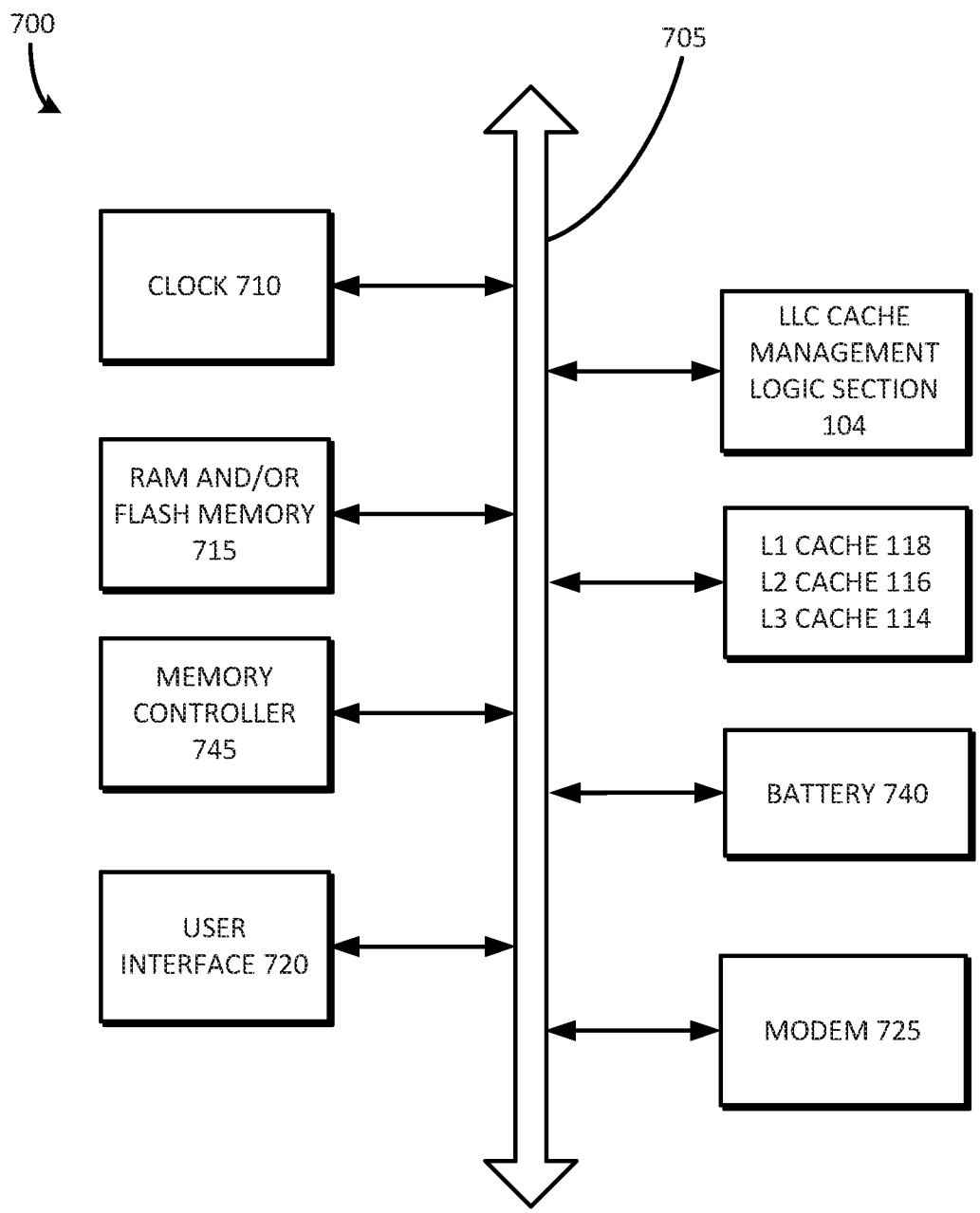
FIG. 7 is an example block diagram of a computer system 700 including the LLC cache management logic section of FIG. 1A in accordance with some embodiments.

FIG. 7 is an example block diagram of a computer system 700 including the LLC cache management logic section 104, the L1 cache 118, the L2 cache 116, and the L3 cache 114 of FIG. 1A in accordance with some embodiments. Referring to FIG. 7, the computing system 700 may also include a clock 710, a random access memory (RAM) 715, a user interface 720, a modem 725 such as a baseband chipset, a memory controller 745, and/or a battery 740, any or all of which may be electrically coupled to a system bus 705. The system 700 including the LLC cache management logic section 104, the L1 cache 118, the L2 cache 116, and the L3 cache 114 may correspond to those embodiments described in detail above, and may also be electrically coupled to the system bus 705.

If the computing system 700 is a mobile device, the battery 740 may power the computing system 700. Although not shown in FIG. 7, the computing system 700 may further include an application chipset, a camera image processor (CIS), a mobile DRAM, and the like.

In example embodiments, the computing system 700 may be used as a computer, computer server, server rack, portable computer, Ultra Mobile PC (UMPC), workstation, net-book, PDA, web tablet, wireless phone, mobile phone, smart phone, e-book, PMP (portable multimedia player), digital camera, digital audio recorder/player, digital picture/video recorder/player, portable game machine, navigation system, black box, 3-dimensional television, a device capable of transmitting and receiving information at a wireless circumstance, one of various electronic devices constituting home network, one of various electronic devices constituting computer network, one of various electronic devices constituting a telematics network, RFID, or one of various electronic devices constituting a computing system.

While a determination of whether a particular bit is asserted or not as generally used herein checks whether the bit is 1 or 0, with 1 meaning it is asserted, and 0 meaning it is not. However, it will be understood that in an alternate embodiment, 0 means asserted and 1 means not asserted, without departing from the inventive concepts disclosed herein.

In some embodiments, a method for coordinating cache management for an exclusive cache hierarchy includes managing, by a coordinated cache logic section, a level three (L3) cache. The method may include managing, by the coordinated cache logic section, a level two (L2) cache. In some embodiments, managing the L3 cache and the L2 cache includes coordinating a cache block replacement policy among the L3 cache and the L2 cache by filtering first data having relatively lower reuse probability from second data having relatively higher reuse probability.

The method may include tracking reuse patterns of demand requests separately from reuse patterns of prefetch requests.

The method may include inserting a first cache block A into the L2 cache. The method may include determining, by the coordinated cache logic section, whether there is a cache hit in the L2 cache. The method may include in response to determining that there is the cache hit, determining whether a prefetch bit associated with the first cache block A is asserted. The method may include in response to determining that the prefetch bit associated with the first cache block A is asserted, increasing a dead block prediction counter for prefetch requests. The method may include in response to determining that the prefetch bit associated with the first cache block A is not asserted, increasing a dead block prediction counter for demand requests. The method may include asserting a re-reference bit associated with the first cache block A. The method may include providing the first cache block A to a core processor.

The method may include inserting a first cache block A into the L2 cache. The method may include determining, by the coordinated cache logic section, whether there is a cache hit in the L2 cache. The method may include in response to determining that there is not the cache hit, determining, by the coordinated cache logic section, whether a cache block replacement is needed. The method may include in response to determining that the cache block replacement is not needed, determining, by the coordinated cache logic section, whether a request for the first cache block A is a prefetch request. The method may include in response to determining that the request for the first cache block A is the prefetch request: inserting the first cache block A into the L2 cache; deasserting a re-reference bit associated with the first cache block A; and asserting a prefetch bit associated with the first cache block A.

The method may include in response to determining that the request for the first cache block A is not the prefetch request: inserting the first cache block A into the L2 cache; deasserting the re-reference bit associated with the first cache block A; and deasserting the prefetch bit associated with the first cache block A.

The method may include inserting a first cache block A into the L2 cache. The method may include determining, by the coordinated cache logic section, whether there is a cache hit in the L2 cache. The method may include in response to determining that there is not the cache hit, determining, by the coordinated cache logic section, whether a cache block replacement is needed. The method may include in response to determining that the cache block replacement is needed, finding a replacement candidate second cache block B.

The method may include determining, by the coordinated cache logic section, whether a re-reference bit associated with the second cache block B is asserted. The method may include in response to determining that the re-reference bit associated with the second cache block B is not asserted, determining, by the coordinated cache logic section, whether a prefetch bit associated with the second cache block B is asserted. The method may include in response to determining that the prefetch bit associated with the second cache block B is asserted, decreasing a dead block prediction counter for prefetch requests.

The method may include determining, by the coordinated cache logic section, whether the dead block prediction counter for prefetch requests is 0. The method may include in response to determining that the dead block prediction counter for prefetch requests is 0. The method may include marking the second cache block B as non-temporal. The method may include sending the second cache block B to the L3 cache. The method may include allocating the second cache block B at a least recently used (LRU) position in the L3 cache.

The method may include determining, by the coordinated cache logic section, whether a re-reference bit associated with the second cache block B is asserted. The method may include in response to determining that the re-reference bit associated with the second cache block B is not asserted, determining, by the coordinated cache logic section, whether a prefetch bit associated with the second cache block B is asserted. The method may include in response to determining that the prefetch bit associated with the second cache block B is not asserted, decreasing a dead block prediction counter for demand requests.

The method may include determining, by the coordinated cache logic section, whether the dead block prediction counter for demand requests is 0. The method may include in response to determining that the dead block prediction counter for demand requests is 0. The method may include marking the second cache block B as non-temporal. The method may include sending the second cache block B to the L3 cache. The method may include allocating the second cache block B at a least recently used (LRU) position in the L3 cache.

The method may include determining, by the coordinated cache logic section, whether the dead block prediction counter for demand requests is 0. The method may include in response to determining that the dead block prediction counter for demand requests is not 0. The method may include marking the second cache block B as temporal. The method may include sending the second cache block B to the L3 cache. The method may include allocating the second cache block B at a least recently used (LRU)+1 position in the L3 cache.

The method may include determining, by the coordinated cache logic section, whether a re-reference bit associated with the second cache block B is asserted. The method may include in response to determining that the re-reference bit associated with the second cache block B is asserted, determining, by the coordinated cache logic section, whether a prefetch bit associated with the second cache block B is asserted. The method may include in response to determining that the prefetch bit associated with the second cache block B is not asserted, determining, by the coordinated cache logic section, whether a dead block prediction counter for demand requests is 0.

The method may include determining, by the coordinated cache logic section, whether a re-reference bit associated with the second cache block B is asserted. The method may include in response to determining that the re-reference bit associated with the second cache block B is asserted, determining, by the coordinated cache logic section, whether a prefetch bit associated with the second cache block B is asserted. The method may include in response to determining that the prefetch bit associated with the second cache block B is asserted, determining, by the coordinated cache logic section, whether a dead block prediction counter for prefetch requests is 0. The method may include in response to determining that the dead block prediction counter for prefetch requests is 0. The method may include marking the second cache block B as non-temporal. The method may include sending the second cache block B to the L3 cache. The method may include allocating the second cache block B at a least recently used (LRU) position in the L3 cache. The method may include in response to determining that the dead block prediction counter for prefetch requests is not 0. The method may include marking the second cache block B as temporal. The method may include sending the second cache block B to the L3 cache. The method may include allocating the second cache block B at a least recently used (LRU)+1 position in the L3 cache.

The method may include determining, by the coordinated cache logic section, whether a re-reference bit associated with the second cache block B is asserted. The method may include in response to determining that the re-reference bit associated with the second cache block B is asserted, determining, by the coordinated cache logic section, whether a prefetch bit associated with the second cache block B is asserted. The method may include in response to determining that the prefetch bit associated with the second cache block B is asserted, determining, by the coordinated cache logic section, whether a dead block prediction counter for prefetch requests is 0. The method may include in response to determining that the dead block prediction counter for prefetch requests is 0: marking the second cache block B as non-temporal; bypassing the L3 cache; and sending the second cache block B to a main memory.

The method may include in response to determining that the dead block prediction counter for prefetch requests is not 0: marking the second cache block B as temporal; sending the second cache block B to the L3 cache; and allocating the second cache block B at a least recently used (LRU)+1 position in the L3 cache.

The method may include determining, by the coordinated cache logic section, whether a re-reference bit associated with the second cache block B is asserted. The method may include in response to determining that the re-reference bit associated with the second cache block B is asserted, determining, by the coordinated cache logic section, whether a prefetch bit associated with the second cache block B is asserted. The method may include in response to determining that the prefetch bit associated with the second cache block B is asserted, determining, by the coordinated cache logic section, whether a dead block prediction counter for prefetch requests is 0. The method may include in response to determining that the dead block prediction counter for prefetch requests is 0, determining, by the coordinated cache logic section, whether an L2 cache replacement policy is biased toward bimodal re-reference interval prediction. The method may include in response to determining that the L2 cache replacement policy is biased toward bimodal re-reference interval prediction. The method may include marking the second cache block B as non-temporal. The method may include sending the second cache block B to the L3 cache. The method may include allocating the second cache block B at a least recently used (LRU) position in the L3 cache. The method may include in response to determining that the L2 cache replacement policy is not biased toward bimodal re-reference interval prediction: marking the second cache block B as temporal; sending the second cache block B to the L3 cache; and allocating the second cache block B at a least recently used (LRU)+1 position in the L3 cache.

The method may include determining, by the coordinated cache logic section, whether a re-reference bit associated with the second cache block B is asserted. The method may include in response to determining that the re-reference bit associated with the second cache block B is asserted, determining, by the coordinated cache logic section, whether a prefetch bit associated with the second cache block B is asserted. The method may include in response to determining that the prefetch bit associated with the second cache block B is asserted, determining, by the coordinated cache logic section, whether a dead block prediction counter for prefetch requests is 0. The method may include in response to determining that the dead block prediction counter for prefetch requests is 0, determining, by the coordinated cache logic section, whether an L2 cache replacement policy is biased toward bimodal re-reference interval prediction.

Embodiments are described herein, and illustrated in the drawings, in terms of functional blocks, units and/or modules. Those skilled in the art will appreciate that these blocks, units and/or modules can be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the present disclosure. Further, the blocks, units and/or modules of the embodiments may be physically combined into more complex blocks, units and/or modules without departing from the scope of the present disclosure.

The following discussion is intended to provide a brief, general description of a suitable machine or machines in which certain aspects of the present disclosure can be implemented. Typically, the machine or machines include a system bus to which is attached processors, memory, e.g., random access memory (RAM), read-only memory (ROM), or other state preserving medium, storage devices, a video interface, and input/output interface ports. The machine or machines can be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines can include embedded controllers, such as programmable or non-programmable logic devices or arrays, Application Specific Integrated Circuits (ASICs), embedded computers, smart cards, and the like. The machine or machines can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth®, optical, infrared, cable, laser, etc.

Embodiments can be described by reference to or in conjunction with associated data including functions, procedures, data structures, application programs, etc. which when accessed by a machine results in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Having described and illustrated the principles of the present disclosure with reference to illustrated embodiments, it will be recognized that the illustrated embodiments can be modified in arrangement and detail without departing from such principles, and can be combined in any desired manner. And although the foregoing discussion has focused on particular embodiments, other configurations are contemplated. In particular, even though expressions such as "according to an embodiment" or the like are used herein, these phrases are meant to generally reference embodiment possibilities, and are not intended to limit the present disclosure to particular embodiment configurations. As used herein, these terms can reference the same or different embodiments that are combinable into other embodiments.

Embodiments of the present disclosure may include a non-transitory machine-readable medium comprising instructions executable by one or more processors, the instructions comprising instructions to perform the elements of the embodiments as described herein.

Consequently, in view of the wide variety of permutations to the embodiments described herein, this detailed description and accompanying material is intended to be illustrative only, and should not be taken as limiting the scope of the embodiments. What is claimed as the present system and method, therefore, is all such modifications as may come within the scope of the following claims and equivalents thereto.

What is claimed is:

1. A method for coordinating cache management for an exclusive cache hierarchy, the method comprising:
   managing, by a coordinated cache logic section, a level three (L3) cache; and
   managing, by the coordinated cache logic section, a level two (L2) cache,
   wherein managing the L3 cache and the L2 cache includes coordinating a cache block replacement policy among the L3 cache and the L2 cache by filtering first data having relatively lower reuse probability from second data having relatively higher reuse probability; and
   tracking reuse patterns of demand requests separately from reuse patterns of prefetch requests.

2. The method of claim 1, further comprising:
   inserting a first cache block A into the L2 cache;
   determining, by the coordinated cache logic section, whether there is a cache hit in the L2 cache;
   in response to determining that there is the cache hit, determining whether a prefetch bit associated with the first cache block A is asserted;
   in response to determining that the prefetch bit associated with the first cache block A is asserted, increasing a dead block prediction counter for prefetch requests;
   in response to determining that the prefetch bit associated with the first cache block A is not asserted, increasing a dead block prediction counter for demand requests;
   asserting a re-reference bit associated with the first cache block A; and
   providing the first cache block A to a core processor.

3. The method of claim 1, further comprising:
   inserting a first cache block A into the L2 cache;
   determining, by the coordinated cache logic section, whether there is a cache hit in the L2 cache;
   in response to determining that there is not the cache hit, determining, by the coordinated cache logic section, whether a cache block replacement is needed;
   in response to determining that the cache block replacement is not needed, determining, by the coordinated cache logic section, whether a request for the first cache block A is a prefetch request;
   in response to determining that the request for the first cache block A is the prefetch request:
      inserting the first cache block A into the L2 cache;
      deasserting a re-reference bit associated with the first cache block A; and
      asserting a prefetch bit associated with the first cache block A;
   in response to determining that the request for the first cache block A is not the prefetch request:
      inserting the first cache block A into the L2 cache;
      deasserting the re-reference bit associated with the first cache block A; and
      deasserting the prefetch bit associated with the first cache block A.

4. A method for coordinating cache management for an exclusive cache hierarchy, the method comprising:
   managing, by a coordinated cache logic section, a level three (L3) cache;
   managing, by the coordinated cache logic section, a level two (L2) cache;
   wherein managing the L3 cache and the L2 cache includes coordinating a cache block replacement policy among the L3 cache and the L2 cache by filtering first data having relatively lower reuse probability from second data having relatively higher reuse probability;
   inserting a first cache block A into the L2 cache;
   determining, by the coordinated cache logic section, whether there is a cache hit in the L2 cache;
   in response to determining that there is not the cache hit, determining, by the coordinated cache logic section, whether a cache block replacement is needed;
   in response to determining that the cache block replacement is needed, finding a replacement candidate second cache block B;
   determining, by the coordinated cache logic section, whether a re-reference bit associated with the second cache block B is asserted;
   in response to determining that the re-reference bit associated with the second cache block B is not asserted, determining, by the coordinated cache logic section, whether a prefetch bit associated with the second cache block B is asserted; and
   in response to determining that the prefetch bit associated with the second cache block B is asserted, decreasing a dead block prediction counter for prefetch requests.

5. The method of claim 4, further comprising:
   determining, by the coordinated cache logic section, whether the dead block prediction counter for prefetch requests is 0;
   in response to determining that the dead block prediction counter for prefetch requests is 0:
      marking the second cache block B as non-temporal;
      sending the second cache block B to the L3 cache; and
      allocating the second cache block B at a least recently used (LRU) position in the L3 cache.

6. A method for coordinating cache management for an exclusive cache hierarchy, the method comprising:
   managing, by a coordinated cache logic section, a level three (L3) cache;
   managing, by the coordinated cache logic section, a level two (L2) cache;
   wherein managing the L3 cache and the L2 cache includes coordinating a cache block replacement policy among the L3 cache and the L2 cache by filtering first data having relatively lower reuse probability from second data having relatively higher reuse probability;
   inserting a first cache block A into the L2 cache;
   determining, by the coordinated cache logic section, whether there is a cache hit in the L2 cache;
   in response to determining that there is not the cache hit, determining, by the coordinated cache logic section, whether a cache block replacement is needed;
   in response to determining that the cache block replacement is needed, finding a replacement candidate second cache block B;
   determining, by the coordinated cache logic section, whether a re-reference bit associated with the second cache block B is asserted;
   in response to determining that the re-reference bit associated with the second cache block B is not asserted, determining, by the coordinated cache logic section, whether a prefetch bit associated with the second cache block B is asserted; and in response to determining that the prefetch bit associated with the second cache block B is not asserted, decreasing a dead block prediction counter for demand requests.

7. The method of claim 6, further comprising:

determining, by the coordinated cache logic section, whether the dead block prediction counter for demand requests is 0;

in response to determining that the dead block prediction counter for demand requests is 0:
  marking the second cache block B as non-temporal;
  sending the second cache block B to the L3 cache; and
  allocating the second cache block B at a least recently used (LRU) position in the L3 cache.

8. The method of claim 6, further comprising:

determining, by the coordinated cache logic section, whether the dead block prediction counter for demand requests is 0;

in response to determining that the dead block prediction counter for demand requests is not 0:
  marking the second cache block B as temporal;
  sending the second cache block B to the L3 cache; and
  allocating the second cache block B at a least recently used (LRU)+1 position in the L3 cache.

9. The method of claim 1, further comprising:

inserting a first cache block A into the L2 cache;

determining, by the coordinated cache logic section, whether there is a cache hit in the L2 cache;

in response to determining that there is not the cache hit, determining, by the coordinated cache logic section, whether a cache block replacement is needed;

in response to determining that the cache block replacement is needed, finding a replacement candidate second cache block B;

determining, by the coordinated cache logic section, whether a re-reference bit associated with the second cache block B is asserted;

in response to determining that the re-reference bit associated with the second cache block B is asserted, determining, by the coordinated cache logic section, whether a prefetch bit associated with the second cache block B is asserted; and in response to determining that the prefetch bit associated with the second cache block B is not asserted, determining, by the coordinated cache logic section, whether a dead block prediction counter for demand requests is 0.

10. The method of claim 1, further comprising:

inserting a first cache block A into the L2 cache;

determining, by the coordinated cache logic section, whether there is a cache hit in the L2 cache;

in response to determining that there is not the cache hit, determining, by the coordinated cache logic section, whether a cache block replacement is needed;

in response to determining that the cache block replacement is needed, finding a replacement candidate second cache block B;

determining, by the coordinated cache logic section, whether a re-reference bit associated with the second cache block B is asserted;

in response to determining that the re-reference bit associated with the second cache block B is asserted, determining, by the coordinated cache logic section, whether a prefetch bit associated with the second cache block B is asserted;

in response to determining that the prefetch bit associated with the second cache block B is asserted, determining, by the coordinated cache logic section, whether a dead block prediction counter for prefetch requests is 0;

in response to determining that the dead block prediction counter for prefetch requests is 0:
  marking the second cache block B as non-temporal;
  sending the second cache block B to the L3 cache; and
  allocating the second cache block B at a least recently used (LRU) position in the L3 cache;

in response to determining that the dead block prediction counter for prefetch requests is not 0:
  marking the second cache block B as temporal;
  sending the second cache block B to the L3 cache; and
  allocating the second cache block B at a least recently used (LRU)+1 position in the L3 cache.

11. The method of claim 1, further comprising:

inserting a first cache block A into the L2 cache;

determining, by the coordinated cache logic section, whether there is a cache hit in the L2 cache;

in response to determining that there is not the cache hit, determining, by the coordinated cache logic section, whether a cache block replacement is needed;

in response to determining that the cache block replacement is needed, finding a replacement candidate second cache block B;

determining, by the coordinated cache logic section, whether a re-reference bit associated with the second cache block B is asserted;

in response to determining that the re-reference bit associated with the second cache block B is asserted, determining, by the coordinated cache logic section, whether a prefetch bit associated with the second cache block B is asserted;

in response to determining that the prefetch bit associated with the second cache block B is asserted, determining, by the coordinated cache logic section, whether a dead block prediction counter for prefetch requests is 0;

in response to determining that the dead block prediction counter for prefetch requests is 0:
  marking the second cache block B as non-temporal;
  bypassing the L3 cache; and
  sending the second cache block B to a main memory;

in response to determining that the dead block prediction counter for prefetch requests is not 0:
  marking the second cache block B as temporal;
  sending the second cache block B to the L3 cache; and
  allocating the second cache block B at a least recently used (LRU)+1 position in the L3 cache.

12. The method of claim 1, further comprising:

inserting a first cache block A into the L2 cache;

determining, by the coordinated cache logic section, whether there is a cache hit in the L2 cache;

in response to determining that there is not the cache hit, determining, by the coordinated cache logic section, whether a cache block replacement is needed;

in response to determining that the cache block replacement is needed, finding a replacement candidate second cache block B;

determining, by the coordinated cache logic section, whether a re-reference bit associated with the second cache block B is asserted;

in response to determining that the re-reference bit associated with the second cache block B is asserted, determining, by the coordinated cache logic section, whether a prefetch bit associated with the second cache block B is asserted;

in response to determining that the prefetch bit associated with the second cache block B is asserted, determining, by the coordinated cache logic section, whether a dead block prediction counter for prefetch requests is 0;

in response to determining that the dead block prediction counter for prefetch requests is 0, determining, by the coordinated cache logic section, whether an L2 cache replacement policy is biased toward bimodal re-reference interval prediction;

in response to determining that the L2 cache replacement policy is biased toward bimodal re-reference interval prediction:
   marking the second cache block B as non-temporal;
   sending the second cache block B to the L3 cache; and
   allocating the second cache block B at a least recently used (LRU) position in the L3 cache;

in response to determining that the L2 cache replacement policy is not biased toward bimodal re-reference interval prediction:
   marking the second cache block B as temporal;
   sending the second cache block B to the L3 cache; and
   allocating the second cache block B at a least recently used (LRU)+1 position in the L3 cache.

13. The method of claim 1, further comprising:

inserting a first cache block A into the L2 cache;

determining, by the coordinated cache logic section, whether there is a cache hit in the L2 cache;

in response to determining that there is not the cache hit, determining, by the coordinated cache logic section, whether a cache block replacement is needed;

in response to determining that the cache block replacement is needed, finding a replacement candidate second cache block B;

determining, by the coordinated cache logic section, whether a re-reference bit associated with the second cache block B is asserted;

in response to determining that the re-reference bit associated with the second cache block B is asserted, determining, by the coordinated cache logic section, whether a prefetch bit associated with the second cache block B is asserted; and in response to determining that the prefetch bit associated with the second cache block B is asserted, determining, by the coordinated cache logic section, whether a dead block prediction counter for prefetch requests is 0.

14. The method of claim 13, further comprising in response to determining that the dead block prediction counter for prefetch requests is 0, determining, by the coordinated cache logic section, whether an L2 cache replacement policy is biased toward bimodal re-reference interval prediction.

15. The method of claim 14, further comprising in response to determining that the L2 cache replacement policy is biased toward bimodal re-reference interval prediction:
   marking the second cache block B as non-temporal;
   sending the second cache block B to the L3 cache; and
   allocating the second cache block B at a least recently used (LRU) position in the L3 cache.

16. The method of claim 15, further comprising in response to determining that the L2 cache replacement policy is not biased toward bimodal re-reference interval prediction:
   marking the second cache block B as temporal;
   sending the second cache block B to the L3 cache; and
   allocating the second cache block B at a least recently used (LRU)+1 position in the L3 cache.

* * * * *

UNITED STATES PATENT AND TRADEMARK OFFICE
CERTIFICATE OF CORRECTION

PATENT NO. : 10,606,752 B2
APPLICATION NO. : 15/890240
DATED : March 31, 2020
INVENTOR(S) : Yingying Tian et al.

Page 1 of 1

It is certified that error appears in the above-identified patent and that said Letters Patent is hereby corrected as shown below:

On the Title Page

Column 1, item (72), correct the fourth inventor's legal name to read as follows:
Peddolla Ravikanth REDDY Signed and Sealed this
Nineteenth Day of March, 2024

Katherine Kelly Vidal
*Director of the United States Patent and Trademark Office*